(12) United States Patent
Clausen et al.

(10) Patent No.: US 9,718,494 B2
(45) Date of Patent: Aug. 1, 2017

(54) HOLLOW STRUCTURE WITH FLANGE

(71) Applicant: BENTELER AUTOMOBILTECHNIK GMBH, Paderborn (DE)

(72) Inventors: Edwin List Clausen, Løit Kirkeby Åbenrå (DK); Kathy Hansen, Tønder (DK)

(73) Assignee: Benteler Automobiltechnik GmbH, Paderborn (DE)

( * ) Notice: Subject to any disclaimer, the term of this patent is extended or adjusted under 35 U.S.C. 154(b) by 19 days.

(21) Appl. No.: 14/620,461

(22) Filed: Feb. 12, 2015

(65) Prior Publication Data

US 2015/0225019 A1   Aug. 13, 2015

(30) Foreign Application Priority Data

Feb. 12, 2014   (DE) .................. 10 2014 101 757

(51) Int. Cl.
| | | |
|---|---|---|
| *B62D 21/02* | (2006.01) | |
| *B23K 31/02* | (2006.01) | |
| *B62D 27/02* | (2006.01) | |
| *B62D 29/00* | (2006.01) | |
| *B62D 25/00* | (2006.01) | |
| *B21C 23/08* | (2006.01) | |
| *B23P 15/00* | (2006.01) | |

(52) U.S. Cl.
CPC ............ *B62D 21/02* (2013.01); *B21C 23/085* (2013.01); *B23K 31/022* (2013.01); *B62D 25/00* (2013.01); *B62D 27/02* (2013.01); *B62D 27/026* (2013.01); *B62D 29/008* (2013.01); *B23P 15/00* (2013.01)

(58) Field of Classification Search
CPC ............................. B62D 23/005; B62D 21/02
USPC .................... 296/203.01, 204, 205
See application file for complete search history.

(56) References Cited

U.S. PATENT DOCUMENTS

| | | | |
|---|---|---|---|
| 3,724,678 A | 4/1973 | Challier | |
| 4,327,514 A | 5/1982 | Bourque | |
| 5,979,119 A * | 11/1999 | Trafton ................ | E04B 1/2403 52/40 |
| 6,387,533 B1 | 5/2002 | Ast | |

(Continued)

FOREIGN PATENT DOCUMENTS

| | | |
|---|---|---|
| CN | 1340435 A | 3/2002 |
| CN | 1590187 A | 3/2005 |

(Continued)

OTHER PUBLICATIONS

Chinese Search Report issued by the Chinese Patent Office in Chinese Application No. 2015100696506 on Sep. 30, 2016.

(Continued)

*Primary Examiner* — Joseph D Pape
(74) *Attorney, Agent, or Firm* — Henry M. Feierseisen, LLC

(57) ABSTRACT

A hollow structure for installation as cross member or longitudinal member in a motor vehicle includes a hollow member which is made of light metal and has at least one hollow chamber. The hollow member has a wall which is formed with a slot. A flange sized to extend through the slot has a leg configured to rest by a formfit against a side of an inner surface area of the hollow member and at least one area which is coupled to an outer surface area of the hollow member.

22 Claims, 5 Drawing Sheets

(56) References Cited

U.S. PATENT DOCUMENTS

| | | | |
|---|---|---|---|
| 6,434,907 B1 * | 8/2002 | Simboli | B62D 21/09 296/146.6 |
| 8,702,149 B2 | 4/2014 | Arzoumanian et al. | |
| 2011/0109122 A1 | 5/2011 | Clausen et al. | |
| 2012/0119526 A1 | 5/2012 | Clausen et al. | |
| 2013/0154300 A1 | 6/2013 | Arzoumanian et al. | |

FOREIGN PATENT DOCUMENTS

| | | |
|---|---|---|
| CN | 101208234 A | 6/2008 |
| DE | 198 54 076 | 4/2000 |

OTHER PUBLICATIONS

English translation of Chinese Search Report issued by the Chinese Patent Office in Chinese Application No. 2015100696506 on Sep. 30, 2016.

* cited by examiner

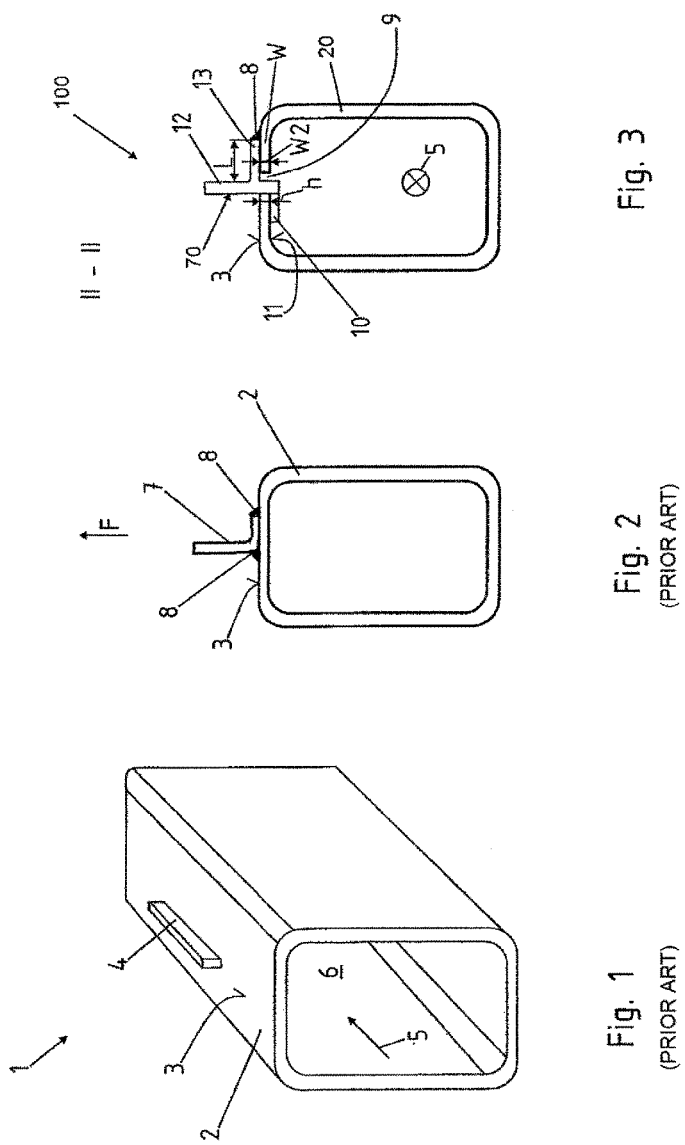

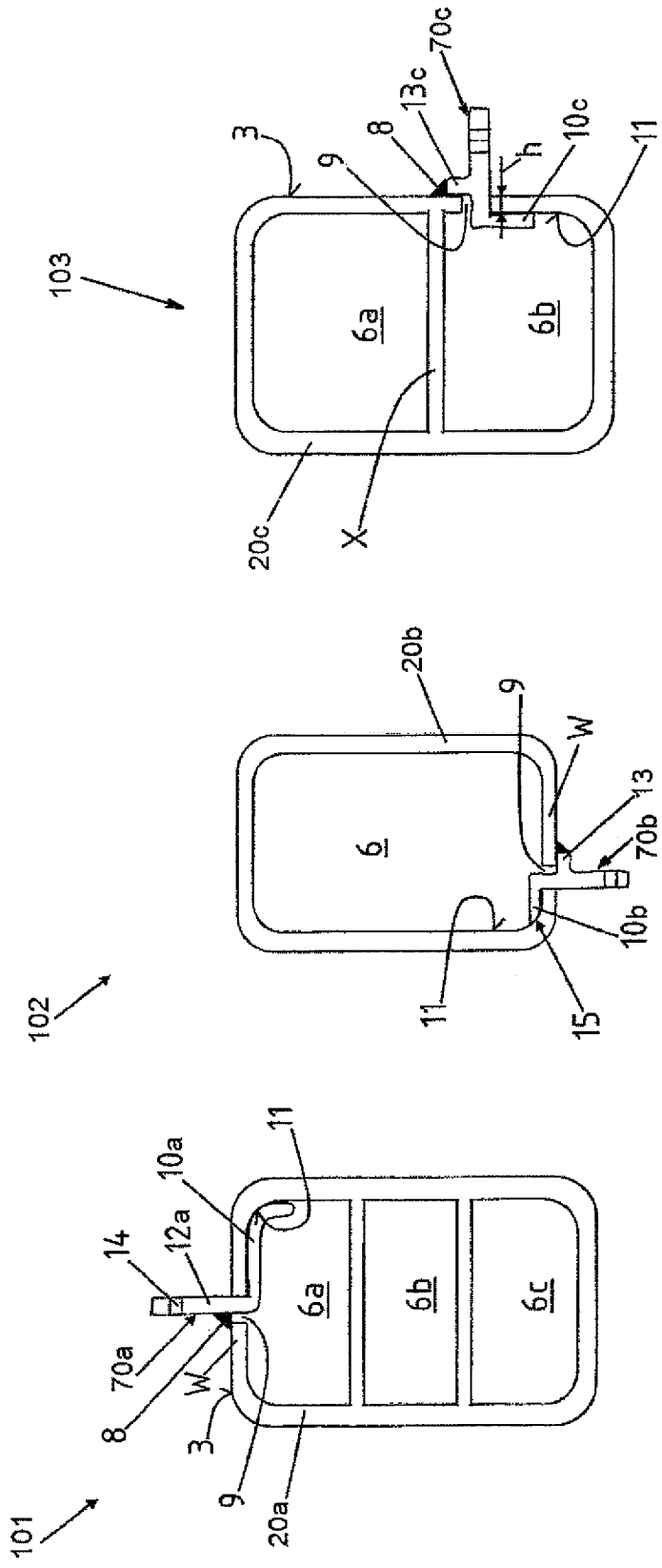

HOLLOW STRUCTURE WITH FLANGE

CROSS-REFERENCES TO RELATED APPLICATIONS

This application claims the priority of German Patent Application, Serial No. 10 2014 101 757.9, filed Feb. 12, 2014, pursuant to 35 U.S.C. 119(a)-(d), the disclosure of which is incorporated herein by reference in its entirety as if fully set forth herein.

BACKGROUND OF THE INVENTION

The present invention relates to a hollow structure.

The following discussion of related art is provided to assist the reader in understanding the advantages of the invention, and is not to be construed as an admission that this related art is prior art to this invention.

It is known in the art to produce cross members or longitudinal members for motor vehicles in the form of hollow members which are made from light metal alloy. This permits a certain freedom in terms of malleability of the cross section of the structure in order to realize appropriate stiffness or functional attachments. At the same time, the slight own weight and the possibility to manufacture the respective products through an extrusion process enable reliable production and yet to meet the demands for a consistent implementation of lightweight construction.

Oftentimes, the hollow members need to be provided on their outer surface area with a flange. FIG. 1 is a perspective view of such a conventional hollow structure 1 having a hollow member 2 and a flange 4 which protrudes from an outer surface area 3 of the hollow member 2. The flange 4 extends in longitudinal direction 5 of the hollow member for attachment of further parts, not shown here. The hollow member 2 has a hollow chamber which is closed in cross section. FIG. 2 shows a cross sectional view of another conventional hollow structure in which a flange 7 is coupled to the outer surface area 3 of the hollow member 2 by two joining seams 8. When exposed to a tensile force applied in force direction F, this type of hollow structure rapidly reaches its limits when exposed to stress.

It would be desirable and advantageous to provide an improved hollow structure which obviates prior art shortcomings and which is easy to make in a cost-efficient manner while still being lightweight and flexible in terms of disposition and orientation.

SUMMARY OF THE INVENTION

According to one aspect of the present invention, a hollow structure for installation as cross member or longitudinal member in a motor vehicle includes a hollow member made of light metal and having at least one hollow chamber, the hollow member having a wall formed with a slot, and a flange sized to extend through the slot and having a leg which is configured to rest by a formfit against a side of an inner surface area of the hollow member, and at least one area which is coupled to an outer surface area of the hollow member.

According to another advantageous feature of the present invention, the at least one area of the flange may be coupled to the outer surface area of the hollow member by a material joint, advantageously by a thermal joint, e.g. welding. Other options may also include bonding using an adhesive, or by a form fit, such as riveting or combination of force and form fit, such as bolting, or other type of interference fit.

According to another advantageous feature of the present invention, the hollow member and/or the flange may be made of aluminum alloy. The hollow structure according to the invention may be produced as endless hollow members through an extrusion process and have a hollow chamber which may be closed or also open on one side.

The present invention resolves prior art problems by providing the hollow member with a slot which extends in a longitudinal direction for passage of a flange into the hollow member, thereby enabling a formfitting coupling and in addition also a material joint. The slot can be formed in the wall of the hollow member during the extrusion process, or by a separation process, e.g. cutting or laser beam cutting. Advantageously, the separation process is done subsequently because there is no need to orient the slot in parallel relation to the longitudinal direction but the slot may also be formed in the hollow member at an angle to the longitudinal direction, in which case the flange is also arranged in the hollow member at an angle to the longitudinal direction so that the hollow structure, comprised of hollow member and flange, can be produced through welding as material joint. There is thus flexibility in terms of providing the slot which may extend through the wall of the hollow member so that the presence of several slots is possible which can be disposed in offset relation to the axial direction and offset in parallel relation to the longitudinal direction, regardless of the radially circumferential orientation relative to the longitudinal direction. It is also conceivable to provide the slots in the hollow member at an angle to the longitudinal direction or for example in orthogonal direction to the longitudinal direction.

According to another advantageous feature of the present invention, the flange may have a web extending from the leg at an angle thereto. The angle can be 45° to 135°. Currently preferred is an angle of 90°. The flange has thus in its basic configuration the shape of an L. When the hollow member is produced as endless structure by extrusion and cut to a desired length of a cross member or longitudinal member, the slot is then provided subsequently in the outer wall of the hollow member. The leg of the flange is then inserted in the slot. Advantageously, the slot has a width which is greater than a wall thickness of the leg.

Once the leg is almost entirely inserted in the slot, the web extends from the leg at an angle, advantageously at an angle of 90°. The flange is then tilted in the slot so that the leg rests formfittingly against the inner surface area of the hollow member. The web can then be coupled to the outer surface area by a thermal joint provided on a leg-distal side of the slot. Currently preferred is the provision of a fillet weld between slot and web projecting out of the slot. Advantageously, the web can be coupled to the outer surface area by a thermal joining seam provided on a leg-distal side of the slot. This ensures that a tensile force, especially one that is applied from the outer surface area of the hollow member at 90°, is resisted on one side by a formfit and on the opposite side by a material joint.

As an alternative, it is, of course, also conceivable to mechanically join the web and the wall of the hollow profile, e.g. by an interference fit in the area of the wall doubling, advantageously using joining aids that are attached only from the outer side.

The slot may also be provided by initially executing a separation process and by subsequently bending upwards one side of the slot. A flange, substantially T-shaped in cross section with projecting T-shaped leg, is then pushed underneath the upwardly bent side until resting against the inner surface area of the hollow member, with the opposite T-shaped leg resting against the outer surface area of the hollow member. Thereafter, the adjacent parts are coupled by a material joint so that the projecting flange region protrudes substantially at a 90° angle from the hollow member.

According to another advantageous feature of the present invention, the leg can be extended and thus sized sufficient to rest by a formfit against a second side of the inner surface area of the hollow chamber. Advantageously, the leg may be coupled by a formfit with the second side of the inner surface area of the hollow chamber. It is thus possible, for example, to provide a formfit upon the inner surface area in immediate vicinity next to the slot, as the leg rests against one side of the inner surface area, and then with its extension on the second side of the inner surface area, e.g. by bolting or riveting, thereby providing an additional force fit. This ensures again that a tensile force or compressive force can be resisted by the flange not only when exerted upon the outer wall in the region of the slot but also a spaced-apart wall of the hollow member.

According to another advantageous feature of the present invention, any connection may further be assisted by applying an adhesive. For example, the leg and the inner surface area may further be bonded with one another by an adhesive. An example of an appropriate adhesive includes a thermally activatable adhesive so that the adhesive cannot freely flow initially and/or is non-adhesive, when the flange is inserted into the slot, and is subsequently activated by heat input generated by the thermal joint or by additional thermal treatment so as to bond the inner surface area and the leg of the flange.

According to another advantageous feature of the present invention, the flange can include an arm extending from the web and sized to rest, at least in part, against the outer surface area of the hollow member. In this way, the slot can be made significantly wider, for example, for insertion of the flange into the hollow member. The inner surface area then comes into formfitting contact with the leg, with the outer surface area coming into formfitting contact with the arm, so that a wider slot is covered by the transverse extension of leg and arm.

According to another advantageous feature of the present invention, the arm has an end which may be coupled to the outer surface area by a material joint.

According to another advantageous feature of the present invention, the arm can be configured to project from the web at an angle between 45° to 135°, with the leg and the arm oriented in opposite directions. Currently preferred is an angle of 90°. Advantageously the leg and the arm extend at a vertical offset in relation to the web so that the leg rests upon the inner outer surface area and the arm on the outer surface area of the hollow member. The vertical offset between topside of the leg and underside of the arm corresponds substantially to the wall thickness of the hollow member in the region of the slot. As a result, forces applied upon the flange are dispersed across a greater area when conducted into the hollow member. At the same time, the additional formfit provides relief of the material joint when compared to a purely welded joint.

According to another advantageous feature of the present invention, the leg can have a cross sectional contour in correspondence to a cross sectional profile of the inner surface area. As a result, the leg may also have, for example, a curved cross sectional profile so that the leg may also complement a radiused inner surface area.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective view of a conventional hollow structure;

FIG. 2 is a cross sectional view of a conventional hollow structure;

FIG. 3 is a cross sectional view of a first embodiment of a hollow structure according to the present invention;

FIG. 4 is a cross sectional view of a second embodiment of a hollow structure according to the present invention;

FIG. 5 is a cross sectional view of a third embodiment of a hollow structure according to the present invention;

FIG. 6 is a cross sectional view of a fourth embodiment of a hollow structure according to the present invention;

DETAILED DESCRIPTION OF PREFERRED EMBODIMENTS

Figure 7:
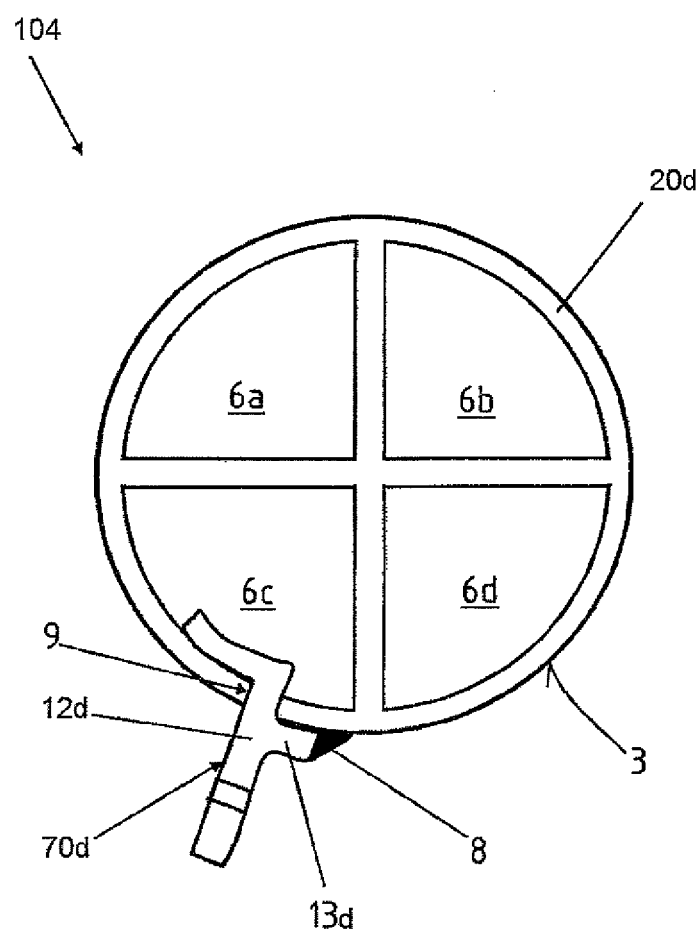
FIG. 7 is a cross sectional view of a fifth embodiment of a hollow structure according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 3, there is shown a cross sectional view of a first embodiment of a hollow structure according to the present invention, generally designated by reference numeral 100. The hollow structure 100 includes a hollow member 20 which is formed with a slot 9 extending in longitudinal direction 5. A flange 7 is inserted into the slot 9 and has a leg 10 which rests formfittingly against an inner surface area 11 of the hollow member 20. Extending from the leg 10 at an angle of 90° is a web 12 sized to extend beyond the outer surface area 3 of the hollow member 20. An arm 13 extends from the web 12 at an angle of 90° and rests formfittingly against the outer surface area 3 of the hollow member 20. The arm 13 has a web-distal end which is coupled to the outer surface area 3 by a joining seam 8. The arm 13 and the leg 10 are spaced from one another at a vertical offset h which substantially corresponds to a wall thickness w2 of the wall W of the hollow member 2 in the region of the slot 9. The arm 13 has a length L selected to effect a double layer for reinforcement by balancing the stress being introduced.

FIG. 4 shows a cross sectional view of a second embodiment of a hollow structure according to the present invention, generally designated by reference sign 101. In the following description, parts corresponding with those in FIG. 3 will be identified, where appropriate for the understanding of the invention, by corresponding reference numerals followed by an "a". In this embodiment, the hollow structure 101 has a hollow member 20a which is configured as a three-chamber hollow member with three hollow chambers 6a, 6b, 6c. Slot 9 is formed in the wall W of the hollow member 20a for passage of a flange 70a. The flange 70a has a leg 10a which has a cross sectional profile to complement the inner contour of the inner surface area 11. As a result, a greater formfit is realized in this region. The flange 70a has a web 12a which is directly coupled with the outer surface area 3 of the hollow member 20 by a joining seam 8. The web 12a is provided with a mounting hole 14 for passage of a screw bolt for example.

FIG. 5 shows a cross sectional view of a third embodiment of a hollow structure according to the present invention, generally designated by reference numeral 102. In the following description, parts corresponding with those in FIG. 3 will be identified, where appropriate for the understanding of the invention, by corresponding reference numerals followed by a "b". In this embodiment, the hollow structure 102 includes a hollow member 20b which has an underside having a wall W which is formed with slot 9 for insertion of a flange 70b. The flange 70b has an arm 13b which is sized shorter in comparison to the arm 13 of FIG. 3, and a leg 10b formed with a rounded pointed end 15 to complement the adjacent profile of the inner surface area 11 of the hollow member 20b.

FIG. 6 shows a cross sectional view of a fourth embodiment of a hollow structure according to the present invention, generally designated by reference numeral 103. In the following description, parts corresponding with those in FIG. 3 will be identified, where appropriate for the understanding of the invention, by corresponding reference numerals followed by a "c". In this embodiment, the hollow structure 102 includes a hollow member 20c which is configured as a two-chamber hollow member with two hollow chambers 6a, 6b, separated by a partition wall X. Slot 9 is formed here, by way of example, in the wall W of the hollow chamber 6b. The hollow member 20c includes a flange 70c which has a leg 10c resting formfittingly upon the inner surface area 11. Arm 13c of the flange 70c has a vertical offset h to the leg 10c and an end which is coupled with the outer surface area 3 of the hollow member 20c by a material joint in the form of a joining seam 8. The partition wall X provides support of the flange 70c in the region of the joining seam 8 of the arm 13c.

FIG. 7 shows a cross sectional view of a fifth embodiment of a hollow structure according to the present invention, generally designated by reference numeral 104. In the following description, parts corresponding with those in FIG. 3 will be identified, where appropriate for the understanding of the invention, by corresponding reference numerals followed by a "d". In this embodiment, the hollow structure 104 includes a hollow member 20d which is round in cross section and configured as a four-chamber hollow member with four hollow chambers 6a, 6b, 6c, 6d. Slot 9 is formed here, by way of example, in the wall W of the hollow chamber 6. The hollow member 20d includes a flange 70d having a web 12d which is substantially received in the slot 9 in formfitting manner. Arm 13d of the flange 70c is coupled with the outer surface area 3 of the hollow member 20d by a material joint in the form of a joining seam 8. In this embodiment, the flange 70d is pushed through the slot 9 from an end face.

Figure 8:
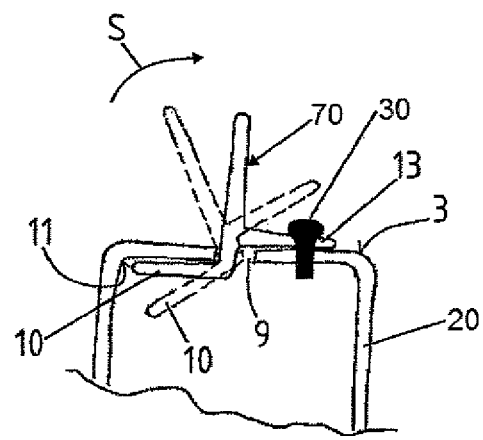
FIG. 8 is a schematic cross sectional illustration of a production process for a hollow structure according to the present invention.

FIG. 8 is a schematic cross sectional illustration of a production process with reference to the hollow structure 100 of FIG. 3 by way of example, and in particular illustrates the placement of the flange 7 in the hollow member 20. As shown by broken line, the flange 70 is initially inserted with its leg 10 through the slot 9 into the hollow chamber 6. Subsequently, the flange 7 is pivoted in a direction indicated by arrow S so that the leg 10 comes into formfitting contact with the inner surface area 11 of the hollow member 20 and the arm 13 comes into formfitting contact with the outer surface area 3 of the hollow member 20. Thus, it becomes possible to insert the flange 70 in any manner and there is no need to insert the flange 70 from an end face into the hollow member 20. Furthermore, the arm 13 may also be coupled with the hollow member 20 via a joining aid 30, e.g. a rivet. The joining aid 30 can thus be used to initially pre-position the flange 70 in order for the flange 70 to be coupled later with the hollow member 20 by a thermal joint. Of course, it is also conceivable to use only a joining aid to realize a connection by a form fit or force fit, such as by riveting or bolting, so that thermal joining may be omitted altogether.

Figure 9:
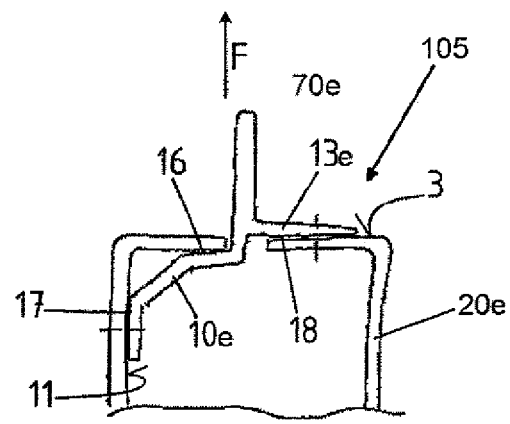
FIG. 9 is a schematic cross sectional illustration of a sixth embodiment of a hollow structure according to the present invention.

FIG. 9 is a schematic cross sectional illustration of yet another embodiment of a hollow structure, generally designated by reference numeral 105. In the following description, parts corresponding with those in FIG. 3 will be identified, where appropriate for the understanding of the invention, by corresponding reference numerals followed by an "e". In this embodiment, the hollow structure 105 includes a hollow member 20e which has a flange 70e with a leg 10e of extended configuration so as to rest formfittingly against two sides of the inner surface area 11 to define two contact zones 16, 17. In this way, a force is dispersed over the two contact zones 16, 17. in addition, it is also possible to apply an adhesive between an arm 13e of the flange 70e and the adjacent outer surface area 3 along a contact zone 18 so that the arm 13e is additionally coupled with the hollow member 20e. Of course, it is also conceivable to add adhesive at the contact zones 16, 17 between the leg 10e and the inner surface area 11.

Figure 10:
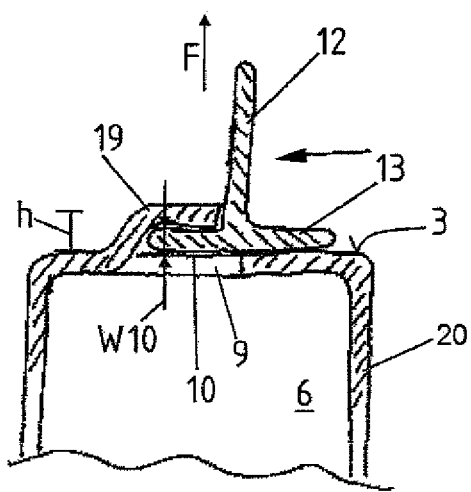
FIG. 10 is a schematic cross sectional illustration of an alternative production process for a hollow structure according to the present invention.

FIG. 10 is a schematic cross sectional illustration of an alternative production process for a hollow structure according to the present invention. Initially a slot 9 is produced in the wall of hollow member 20. Then, a wall portion 19 of the hollow member 20, adjacent to the slot 9, is bent out with respect to the drawing plane, so that the wall portion 19 forms a formfitting contact zone at a vertical offset h which substantially corresponds to the wall thickness w10 of the leg 10. Thus, the leg 10 can be pushed under the bent-out wall portion 19 and is engaged from behind by a form fit in relation to the force direction F. The arm 13 comes again into contact upon the outer surface area 3 of the hollow member 20 and is coupled with the outer surface area 3 by a thermal joint, especially in the region of the end of the arm 13.

Figure 11:
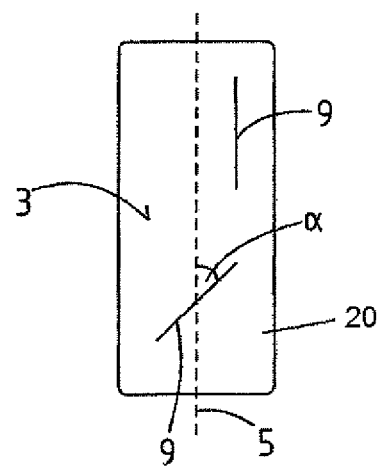
FIG. 11 is a plan view of a hollow structure according to the present invention with two slots of different configuration.

FIG. 11 is a plan view of a hollow structure 20 according to the present invention with two slots 9 of different configuration, defining a lower slot and an upper slot as viewed in the drawing plane. The lower slot 9 extends through the wall W of the hollow member 20 at an angle α in relation to the longitudinal direction 5 of the hollow profile 20, whereas the upper slot 9 extends through the wall W of the hollow member 20 in parallel offset relation to the longitudinal direction 5 of the hollow member 20. Thus, the present invention provides for attachment of a flange the presence of two slots 9 which extend through the wall W of the hollow member 20 and can be located at any position and any angle in relation to the longitudinal direction 5, for example also orthogonal.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A hollow structure for installation as a cross member or longitudinal member in a motor vehicle, said hollow structure comprising:
   a hollow member made of light metal and having at least one hollow chamber, said hollow member having a wall formed with a slot; and
   a flange sized to extend through the slot and having a leg which is configured to rest by a form fit against a side of an inner surface area of the hollow member, and at least one area which is coupled to an outer surface area of the hollow member, wherein the flange includes an arm extending from a web and sized to rest, at least in part, against the outer surface area of the hollow member.

2. The hollow structure of claim 1, wherein at least one of the hollow member and flange is made of aluminum alloy.

3. The hollow structure of claim 1, wherein the flange has a web extending from the leg at an angle thereto.

4. The hollow structure of claim 3, wherein the angle is 45° to 135°.

5. The hollow structure of claim 3, wherein the angle is 90°.

6. The hollow structure of claim 3, wherein the slot is traversed by the leg and the web of the flange.

7. The hollow structure of claim 3, wherein the web is coupled to the outer surface area by a thermal joint provided on a leg distal relative to the slot.

8. The hollow structure of claim 1, wherein the leg is sized sufficient to rest by a form fit against another side of the inner surface area of the hollow chamber.

9. The hollow structure of claim 8, wherein the leg is coupled by a form fit with the other side of the inner surface area of the hollow chamber.

10. The hollow structure of claim 1, wherein the slot has a width which is greater than a wall thickness of the leg.

11. The hollow structure of claim 1, wherein the arm has an end which is coupled to the outer surface area by a material joint.

12. The hollow structure of claim 1, wherein the arm is configured to project from the web at an angle between 45° to 135°, with the leg and the arm oriented in opposite directions.

13. The hollow structure of claim 1, wherein the arm is configured to project from the web at an angle of 90°, with the leg and the arm oriented in opposite directions.

14. The hollow structure of claim 1, wherein the leg has a cross sectional contour in correspondence to a cross sectional profile of the inner surface area.

15. The hollow structure of claim 1, wherein the slot is configured to have at least one area which extends in a longitudinal direction of the hollow member.

16. The hollow structure of claim 1, wherein the slot is configured to extend at an angle to a longitudinal direction of the hollow member.

17. The hollow structure of claim 1, wherein the at least one area of the flange is coupled to the outer surface area of the hollow member by a material joint and additional application of an adhesive.

18. The hollow structure of claim 1, wherein the leg and the arm extend at a vertical offset in relation to the web so that the leg rests upon the inner outer surface area and the arm on the outer surface area of the hollow member.

19. The hollow structure of claim 18, wherein the vertical offset between a topside of the leg and an underside of the arm corresponds substantially to a wall thickness of the hollow member in the region of the slot.

20. The hollow structure of claim 1, wherein the hollow member has a partition wall to divide the hollow chamber into two chambers, said partition wall extending in substantial alignment with the material joint to provide support of the flange in a region of the material joint.

21. The hollow structure of claim 1, wherein the at least one area of the flange is coupled to the outer surface area of the hollow member by at least one connection selected from the group of material joint, adhesive, form fit and force fit.

22. A method of making a hollow structure for a motor vehicle, said method comprising:
   forming a slot in a hollow member;
   inserting a protruding leg of a flange through the slot;
   tilting the flange until the leg of the flange rests against an inner surface area of the hollow member; and
   joining the flange to the hollow member by a thermal joint at a leg distal relative to the outer surface area of the hollow member.

* * * * *